(12) United States Patent
Seo

(10) Patent No.: US 6,966,517 B2
(45) Date of Patent: Nov. 22, 2005

(54) CENTRIFUGAL BRAKE APPARATUS OF BAIT CAST REEL

(75) Inventor: Dae Woong Seo, Seoul (KR)

(73) Assignee: Banax Co., Ltd., Incheon (KR)

( * ) Notice: Subject to any disclaimer, the term of this patent is extended or adjusted under 35 U.S.C. 154(b) by 26 days.

(21) Appl. No.: 10/640,610

(22) Filed: Aug. 13, 2003

(65) Prior Publication Data

US 2004/0050990 A1 Mar. 18, 2004

(30) Foreign Application Priority Data

Sep. 12, 2002 (KR) ...................... 10-2002-0055267

(51) Int. Cl.[7] .......................................... A01K 89/015
(52) U.S. Cl. .................. 242/289; 188/181 A
(58) Field of Search ............................... 242/289, 292; 188/181 A, 185

(56) References Cited

U.S. PATENT DOCUMENTS

| | | | |
|---|---|---|---|
| 5,803,385 A * | 9/1998 | Baisch ...................... 242/289 |
| 6,168,106 B1 * | 1/2001 | Cockerham ................. 242/289 |
| 6,254,021 B1 * | 7/2001 | Morimoto et al. .......... 242/289 |
| 6,364,230 B1 * | 4/2002 | Kawasaki ................... 242/289 |
| 6,394,381 B1 * | 5/2002 | Hirayama ................... 242/289 |
| 6,481,657 B1 * | 11/2002 | Oishi et al. ................ 242/289 |

* cited by examiner

Primary Examiner—Emmanuel Marcelo
(74) Attorney, Agent, or Firm—Ladas and Parry LLP

(57) ABSTRACT

The present invention relates to a centrifugal brake apparatus of a bait cast reel which is capable of selectively adjusting a braking force of a spool by a user in such a manner that a plurality of brake shoes closely contact with an inner surface of a brake ring in proportion to a rotation when casting a bait. The centrifugal brake apparatus according to the present invention includes a spool in which a spool shaft is rotatably engaged to a reel, a brake housing which is engaged to the spool shaft and is rotated together with the spool and includes a slide groove formed in a radial shape and in which a plurality of brake shoes are slidably engaged, and a cover which is engaged to the brake housing and is rotated together with the spool and is rotatably engaged to respect to the brake housing and includes a plurality of engaging protrusions for thereby selectively limiting the movements of the brake shoes.

10 Claims, 9 Drawing Sheets

CENTRIFUGAL BRAKE APPARATUS OF BAIT CAST REEL

BACKGROUND OF THE INVENTION

1. Field of the Invention

The present invention relates to a centrifugal brake apparatus of a bait cast reel, and in particular to a centrifugal brake apparatus of a bait cast reel which is capable of selectively adjusting a braking force of a spool by a user in such a manner that a plurality of brake shoes closely contact with an inner surface of a brake ring in proportion to a rotation of the spool when casting a bait.

2. Description of the Background Art

A bait cast reel is directed to casting a bait and fishhook having various weights connected to an end of a wound fishing line to a desired position. A casting distance is determined based on a user's skill. In the case that the braking of a spool which is rotated at a high speed when casting, is not properly controlled, a fishing line may be further unwound after casting due to an inertial force of a rotating spool, so that a fishing line may get tangled.

A fishing line is released after casting, rotating the spool at a high speed. At this time, a certain inertia force is generated in a rotation of the spool. A fishing line is continuously released in a state that a bait and fishhook have been already cast, a released fishing line may get tangled at a free fall point at which a fishing line is not released any more.

Therefore, in this case, a user must hold a rotating spool using his thumb for thereby controlling the rotation of the rotating spool, so that it is possible to prevent the above problems.

As shown in FIG. 1, a spool shaft 12 is fixed to an inner side of a spool 10. A certain number of brake arms 14 are fixed to a circumferential portion of a brake housing 13 in a radial shape, which is tightly inserted into the spool shaft 12. A brake shoe 15 is slidably engaged to a brake arm 14. In the above construction, when the spool 10 is rotated at a high speed, the brake shoe 15 is escaped to the outside of the spool 10 due to a centrifugal force. Therefore, an end surface of the brake shoe 15 and an inner surface of a brake ring 16 contact each other. Therefore, it is possible to implement a brake control structure capable of decreasing the rotation of the spool 10 based on the above described construction.

However, in the above centrifugal brake apparatus, a plurality of the brake shoes 15 closely contact with the brake ring 16 by a centrifugal force at the time when the spool 10 is rotated, and a braking force is generated at a high speed, so that it is possible to limit an inertial rotational force of the spool 10 after the free fall point. However, as a centrifugal force is generated at the time when the spool 10 is rotated at a high speed, since the brake shoe 15 has a friction force from an initial rotation of the spool 10, a certain interference is applied to a rotation of the spool 10.

Namely, since a friction force occurs at an initial operation stage that the spool 10 is rotated based on a casting operation of bait, a casting distance of bait is decreased due to a rotation resistance force from an initial stage of casting by limiting a rotation of the spool 10.

In addition, since users have different casting forces, in the case that the reel having the same rotation resistance force is used by a user, the casting distance is decreased for a user having a small casting force. In the case of a user having a large casting force, since the rotational force is larger than the rotation resistance force, the centrifugal brake function is not properly implemented.

SUMMARY OF THE INVENTION

Accordingly, it is an object of the present invention to provide a centrifugal brake apparatus of a bait cast reel which is capable of implementing a proper rotation resistance force with respect to a user's casting force by adjusting a rotation resistance force of a spool by a user when casting in such a manner that a plurality of brake shoes are independently operated, and a cover is provided for limiting an operation of each brake shoe.

To achieve the above objects, there is provided a centrifugal force brake apparatus for a bait cast reel which comprises a spool in which a spool shaft is rotatably engaged to a reel; a brake housing which is engaged to the spool shaft and is rotated together with the spool and includes a slide groove formed in a radial shape and in which a plurality of brake shoes are slidably engaged; and a cover which is engaged to the brake housing and is rotated together with the spool and is rotatably engaged to respect to the brake housing and includes a plurality of engaging protrusions for thereby selectively limiting the movements of the brake shoes, wherein as the cover is rotated with respect to the brake housing, the movements of the brake shoes are limited by the engaging protrusions, and a plurality of the brake shoes which are not limited by the engaging protrusions when the spool is rotated, are moved by a centrifugal force, so that a certain friction force is applied to a brake drum.

In the present invention, the brake shoe includes a shoe having an end portion which contacts with the brake shoe for thereby forming a certain friction force therein, an engaging surface which is formed in one surface of a lower portion of the shoe for thereby efficiently contacted with the engaging protrusion and an engaging bar which is formed at both sides of the engaging surface for thereby preventing an escape from the slide groove and further includes a first brake shoe which is provided in an inner side of the brake housing, and a second brake show which is provided in an outer side of the brake housing and is shorter by a certain length compared to the first brake shoe, wherein the first and second brake shoes are alternately formed.

In addition, the slide groove corresponds to the shape of the brake shoe in order for the brake shoe to be accommodated and includes an engaging shoulder portion formed in an end portion of the same for preventing an escape of the brake shoe, wherein a first slide groove in which the first brake shoe is accommodated and a second slide groove in which the second brake shoe is accommodated, are alternately formed in the brake housing in a radial shape. The engaging protrusion includes a first engaging protrusion which is formed in an inner side of the cover and is adapted to limit the movement of the first brake shoe, and a second engaging protrusion which is formed in an outer side of the cover opposite to the first engaging protrusion, wherein the first and second engaging protrusions are formed in a circular shape and have the same angle with respect to the center of the cover.

An insertion groove is formed in a certain portion of the brake housing, a spring is inserted into the insertion groove, a click protrusion is supported by the spring, and a click groove corresponding to the click protrusion inserted in the insertion groove is formed in one side of the cover, so that when the cover is rotated with respect to the brake housing, the click protrusion inserted in the click groove is inserted or escaped for thereby generating a click sound.

The click groove is provided in multiple numbers uniformly at a regular angle with respect to the center of the cover for dividing the rotation angle of the cover with respect to the brake housing.

A limit circular groove having a certain angle with respect to the center is formed in the brake housing, and a limit protrusion inserted into the limit groove is formed in one side of the cover for thereby preventing the cover from being rotated by more than a certain angle with respect to the brake housing.

A pair of support panels having the same inner surfaces as the shapes of the outer surfaces of the cover are formed at both sides of the outer surface of the brake housing, and a support protrusion is formed in an end portion of the support panel for thereby preventing an escape of the cover.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
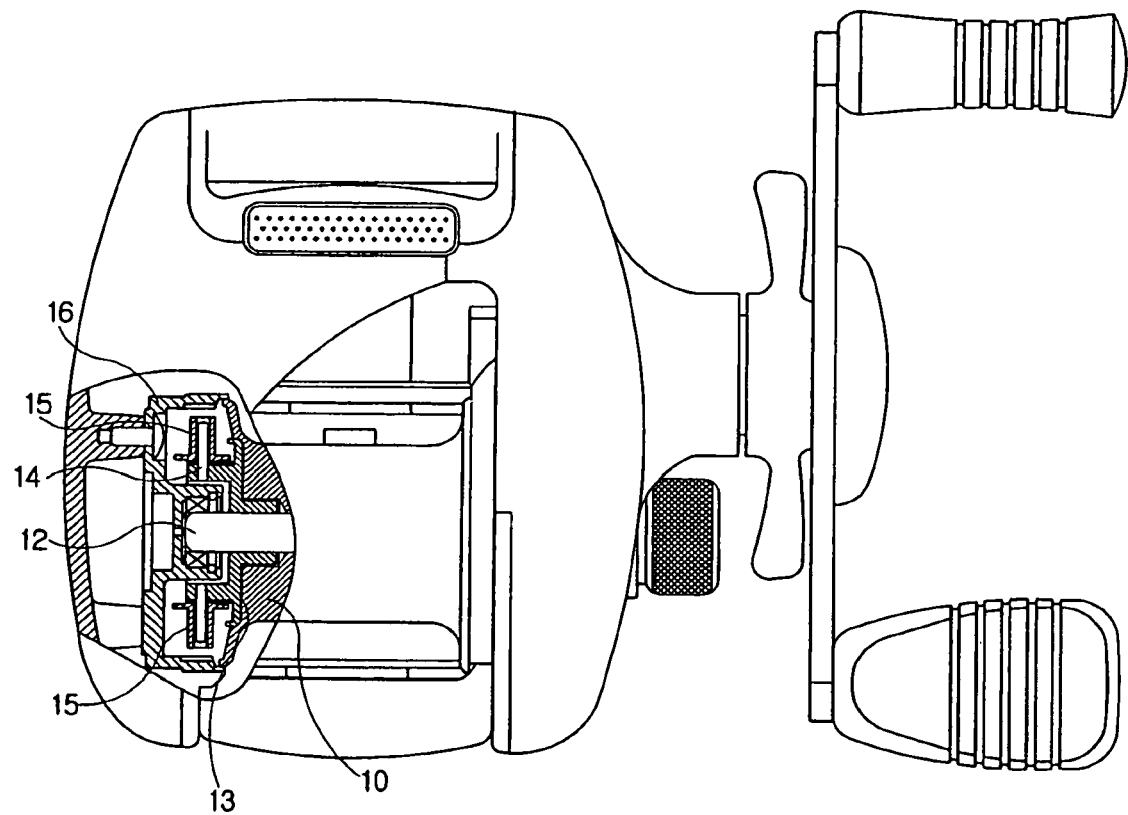
FIG. 1 is a cross sectional view illustrating a centrifugal brake of a conventional bait cast reel.
Figure 2:
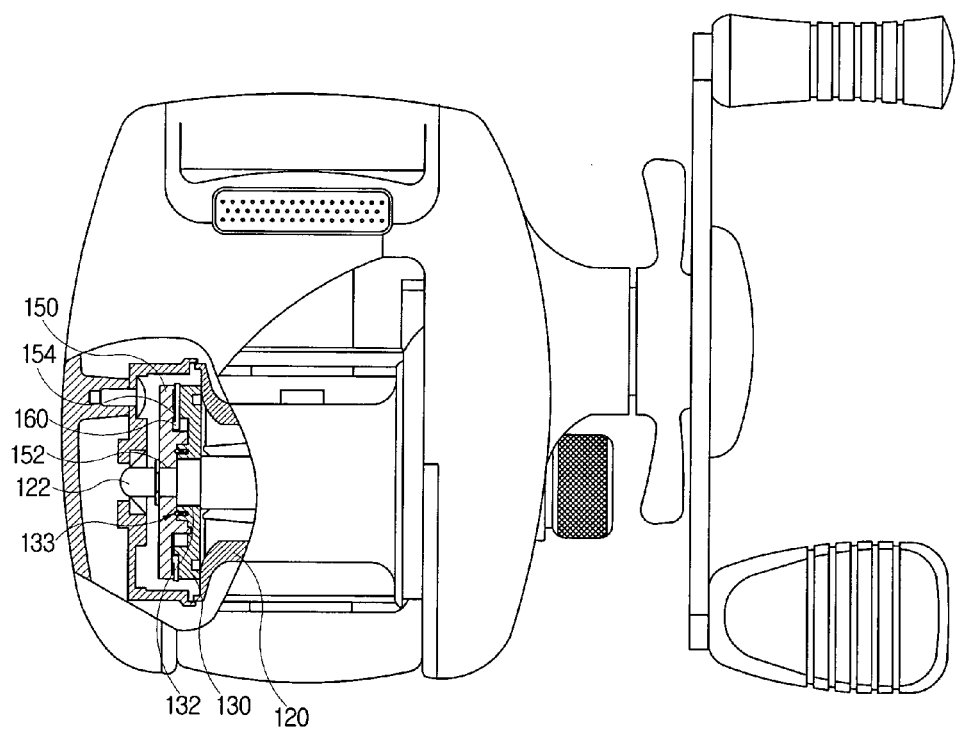
FIG. 2 is a cross sectional view illustrating an inner construction of a centrifugal brake apparatus of a bait cast reel according to the present invention.
Figure 3:
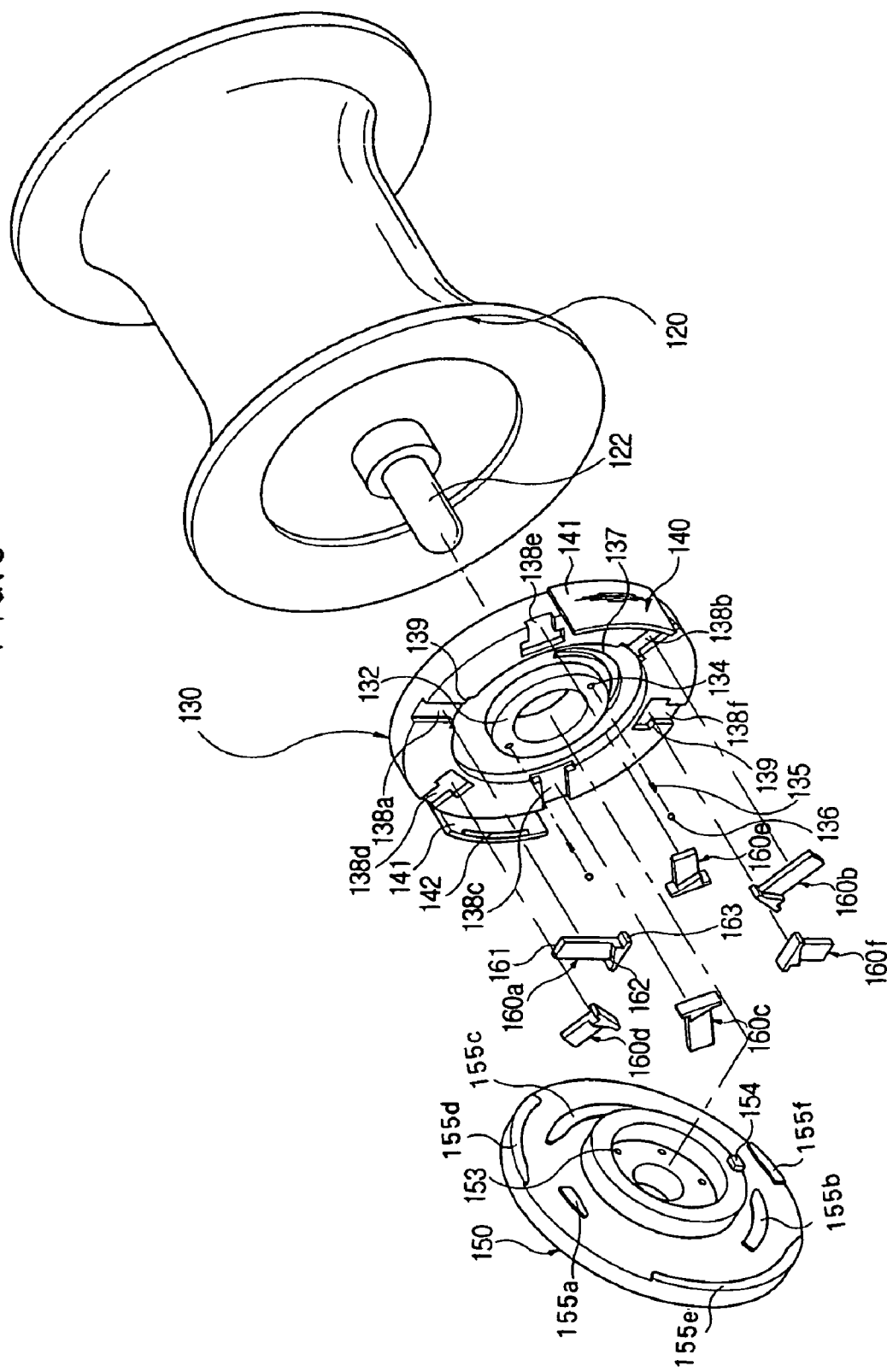
FIG. 3 is a disassembled perspective view illustrating a centrifugal brake apparatus of a bait cast reel according to the present invention.

The preferred embodiments of the present invention will be described with reference to the accompanying drawings.

As shown in FIGS. 2 through 6, a centrifugal brake apparatus of a bait cast reel according to the present invention includes a spool 120 onto which a fishing line is wound, a brake housing 130 which is engaged to an end of a spool shaft 122 for thereby being rotated when the spool 120 is rotated and slidably engaged to respect to the spool shaft 122 of the spool 120 in a radial shape and includes a plurality of brake shoes 160a, 160b, 160c and 160d for being closely contacted with a brake drum 110 by a centrifugal force when the spool 120 is rotated, and a cover 150 which is rotated when the spool 120 is rotated and is rotatably engaged to respect to the brake housing 130 for thereby limiting the movements of the brakes shoes 160a, 160b, 160c and 160d.

The brake housing 130 includes an engaging hole 132 into which the spool shaft 122 is inserted for thereby being rotated together with the spool 120 when the spool 120 is rotated with respect to the spool shaft 122. A click sound generation portion 133 is formed in an outer surface of the engaging hole 132 for thereby generating a click sound when the cover 150 engaged to the brake housing 130 is rotated. A limit groove 137 is formed in an outer side of the click sound generating unit 133 for thereby limiting a rotation angle of the cover 150. A plurality of slide grooves 138a, 138b, 138c, 138d, 138e and 138f in which the brake shoes 160a, 160b, 160c, 160d, 160e and 160f are slidably accommodated, are formed in an outer surface of the brake housing 130. A pair of supports 140 to which the cover 150 engaged to the brake housing 130 are rotatably engaged, are formed in an outer surface of the brake housing 130.

At this time, the click sound generation portion 133 generates a click sound when the cover 150 engaged to the brake housing 130 is rotated and divides a rotational angle of the cover 150. A plurality of insertion grooves 134 are formed in an outer surface of the engaging hole 132. A spring 135 is inserted into the insertion groove 134. A click protrusion 136 is supported by the spring 135. As the cover 150 is rotated in a state that the click protrusion 136 is inserted into the click groove 153 formed in one side of the cover 150, the click protrusion 136 is escaped from the click groove 153 for thereby generating a click sound.

The limit groove 137 is adapted to limit the rotation of the cover 150 which is rotatably engaged to the brake housing 130. The limit protrusion 154 protruded from an inner surface of the cover is inserted into the limit groove 137, so that the limit groove 137 is rotated in the same direction as the rotation radius of the limit protrusion 154 and is rotatable by about 105°.

The slide grooves 138a, 138b, 138c, 138d, 138e and 138f are formed in the brake housing 130 in a radial direction in such a manner that the slide grooves 138a, 138b, 138c, 138d, 138e and 138f are slidable in the outer direction of the brake shoes 160a, 160b, 160c, 160d, 160e and 160f when the spool 120 engaged to the brake shoes 160a, 160b, 160c, 160d, 160e and 160f is rotated, and correspond to the brake shoes 160a, 160b, 160c, 160d, 160e and 160f. Therefore, the brake shoes 160a, 160b, 160c, 160d, 160e and 160f are accommodated therein respectively. In addition, an engaging shoulder portion 139 is formed for preventing the escapes of the brake shoes 160a, 160b, 160c, 160d, 160e and 160f.

The slide grooves 138a, 138b, 138c, 138d, 138e and 138f include first, second and third slide grooves 138a, 138b and 138c and fourth, fifth and sixth slide grooves 138d, 138e and 138f which correspond to the first, second and third brake shoes 160a, 160b and 160c and the fourth, fifth and sixth brake shoes 160d, 160e and 160f respectively. Here, the first, second and third slide grooves 138a, 138b and 138c and the fourth, fifth and sixth slide grooves 138d, 138e and 138f are alternately formed from each other.

The support 140 is adapted in order for the cover 150 engaged to the brake housing 130 to be rotatably supported with respect to the brake housing 130. A pair of support panels 141 which have the inner surfaces having the same shape as the shape of the outer surface of the cover 150 are formed in both sides of the brake housing 130. A support protrusion 142 is protruded from the end portion of the support panel 141 for thereby preventing an escape of the cover 150.

The cover 150 is rotatably engaged to the brake housing 130 for thereby limiting the movements of the brake shoes 160a, 160b, 160c, 160d, 160e and 160f which are slidably mounted in the slide grooves 138a, 138b, 138c, 138d, 138e and 138f of the brake housing 130 and is formed in a circular plate shape having the same diameter as the diameter of the inner surface of the support 140 formed in the brake housing 130 and includes a hollow hole 152 formed in the center portion of the same and rotatably engaged to the spool shaft 122 of the spool 120. A plurality of click grooves 153 into which the click protrusions 136 of the click sound generation portion 133 formed in the brake housing 130 are formed in an outer side of the hollow hole 152. A limit protrusion 154 inserted into the limit groove 137 of the brake housing 130 is formed in an outer portion of the click groove 153. A plurality of engaging protrusions 155a, 155b, 155c, 155d, 155e and 155f are formed in an outer side of the limit protrusion 154 for thereby limiting the movements of the brake shoes 160a, 160b, 160c, 160d, 160e and 160f.

At this time, in the engaging protrusions 155a, 155b, 155c, 155d, 155e and 155f, the first, second and third engaging protrusions 155a, 155b and 155c correspond to the first, second and third brake shoes 160a, 160b and 160c. In addition, the fourth, fifth and sixth engaging protrusions 155d, 155e and 155f correspond to the fourth, fifth and sixth engaging protrusions 155d, 155e and 155f, respectively, so that as the cover 150 is rotated, the movements of the brake shoes 160a, 160b, 160c, 160d, 160e and 160f are limited.

In addition, in the engaging protrusions 155a, 155b, 155c, 155d, 155e and 155f, the first, second and third engaging protrusions 155a, 155b and 155c are provided in the inner side of the cover 150 for thereby limiting the movements of the first, second and third brake shoes 160a, 160b and 160c, and the fourth, fifth and sixth engaging protrusions 155d, 155e and 155f are formed opposite to the first, second and third engaging protrusions 155a, 155b and 155c for thereby limiting the movements of the fourth, fifth and sixth engaging protrusions 155a, 155b and 155c. The lengths of the first and fourth engaging protrusions 155a and 155d are formed in the circular shape based on the same angle with respect to the center of the cover 150. The second and fifth engaging protrusions 155b and 155e and the third and sixth engaging protrusions 155c and 155f are formed in the circular shape based on the same angle with respect to the center of the cover 150. A slanted surface 156 is formed in one side of each of the engaging protrusions 155a, 155b, 155c, 155d, 155e and 155f, namely, in the portions contacting with the brake shoes 160a, 160b, 160c, 160d, 160e and 160f for thereby implementing a smooth contact when contacting with the brake shoes 160a, 160b, 160c, 160d, 160e and 160f.

The brake shoes 160a, 160b, 160c, 160d, 160e and 160f are slidably accommodated in the slide grooves 138a, 138b, 138c, 138d, 138e and 138f which are formed in one surface of the brake housing 130 in a radial shape, so that the brake shoes 160a, 160b, 160c, 160d, 160e and 160f are slid in the outer side of the brake housing 130 by a centrifugal force in the slide grooves 138a, 138b, 138c, 138d, 138e and 138f of the brake housing 130 when the spool 120 is rotated, for thereby applying a friction force to an inner side of the brake drum 110. A shoe 161 is formed in one end of the same and contacts with the brake drum 110 for thereby applying a friction force. A slanted engaging surface 162 is formed in one side of the lower portion of the shoe 161 for fixing itself when contacting with each engaging protrusion 155a, 155b, 155c, 155d, 155e, 155f. An engaging bar 163 is formed in both sides of the engaging surface 162 for thereby being supported by the engaging shoulder portion 139 formed in the slide grooves 138a, 138b, 138c, 138d, 138e and 138f, so that it is possible to prevent an escape of the same.

At this time, in the brake shoes 160a, 160b, 160c, 160d, 160e and 160f, the first, second and third brake shoes 160a 160b and 160c correspond to the first, second and third engaging protrusions 155a, 155b and 155c, and the fourth, fifth and sixth brake shoes 160d, 160e and 160f correspond to the fourth, fifth and sixth engaging protrusions 155d, 155e, and 155f based on the positions of the first, second and third engaging protrusions 155a, 155b and 155c formed in the inner side of the cover 150 and the fourth, fifth and sixth engaging protrusions 155d, 155e and 155f formed in the outer side of the cover 150.

The centrifugal brake apparatus of a bait cast reel according to the present invention will be described with reference to the accompanying drawings.

Figure 7A:
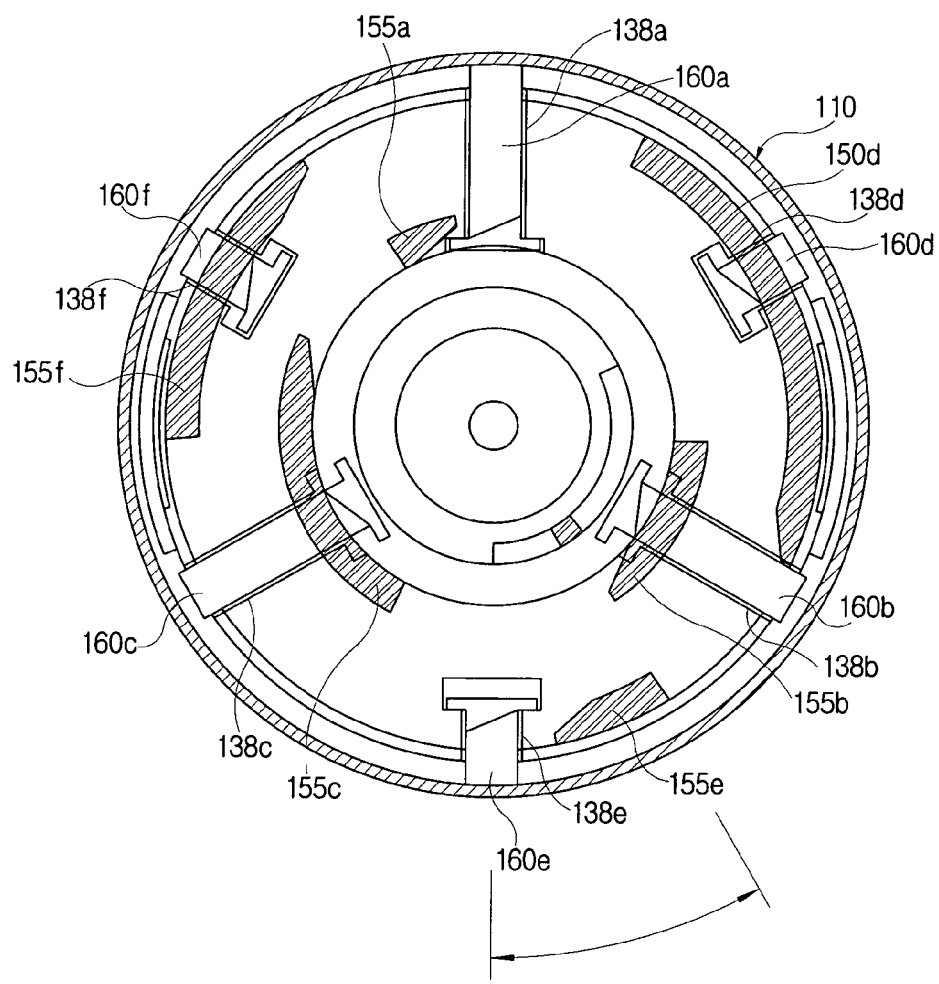
FIGS. 7A through 7C are views sequentially illustrating an operation state of a centrifugal brake apparatus of a bait cast reel according to the present invention.
Figure 7B:
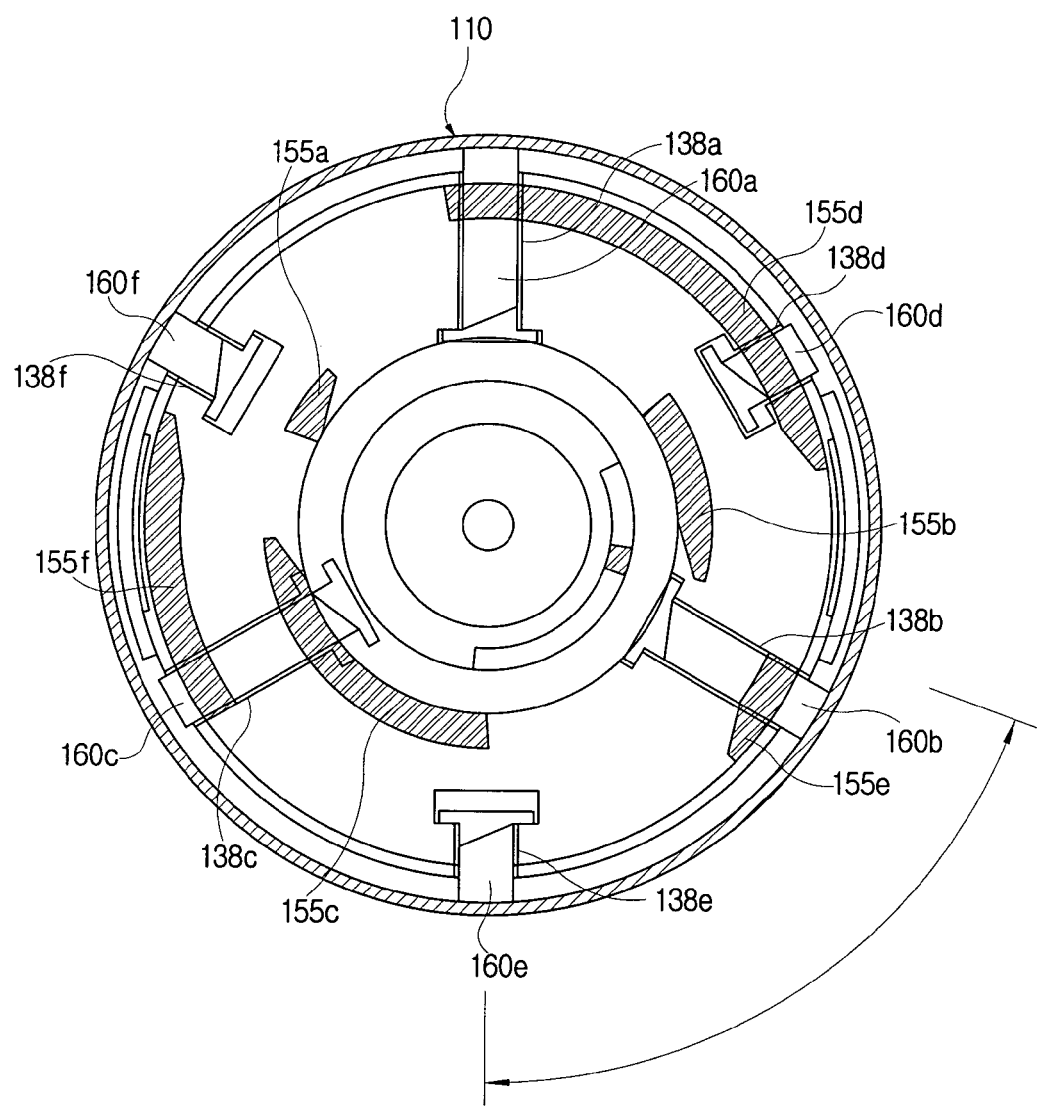
Figure 7C:
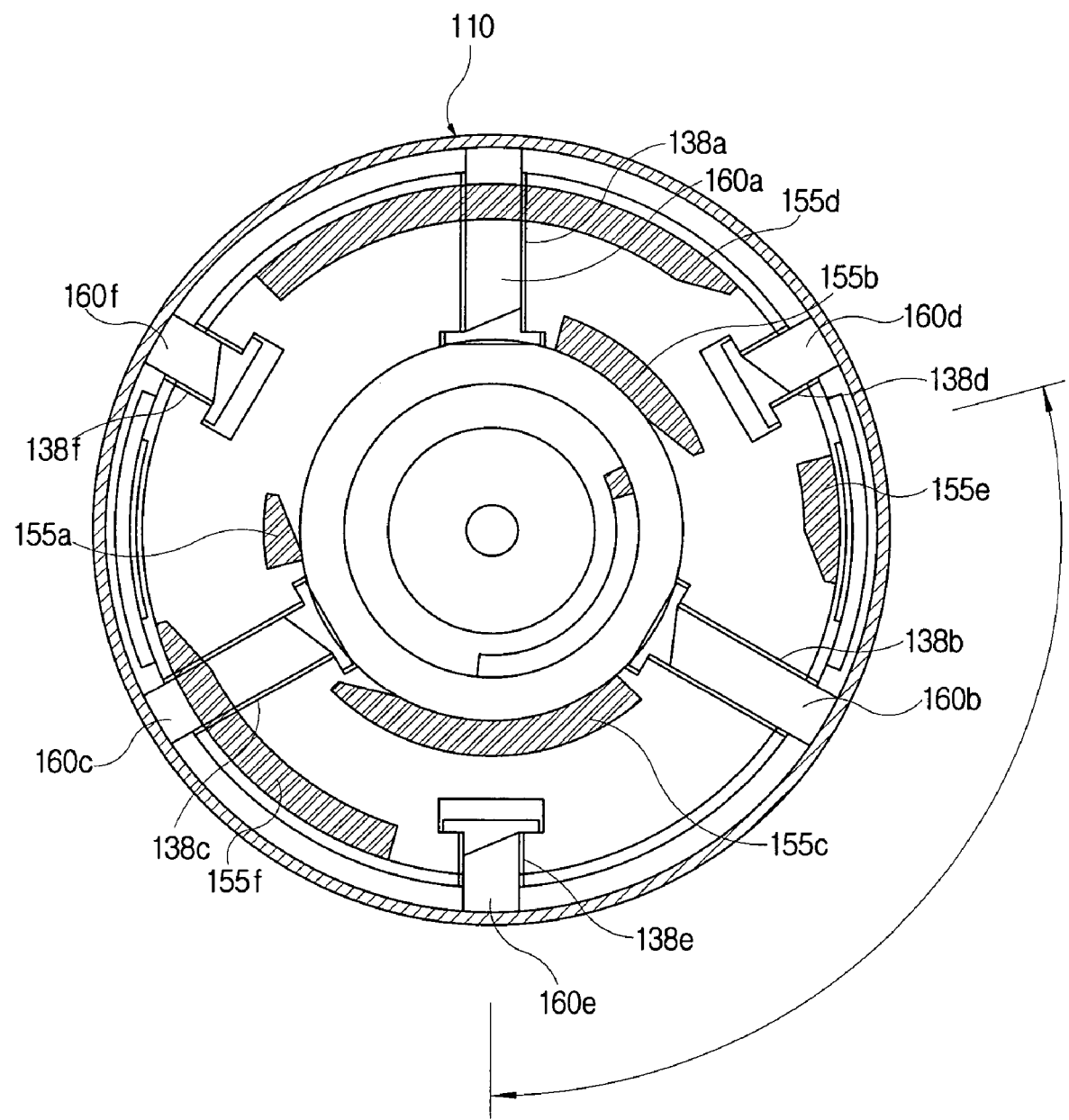

FIGS. 7A through 7C are views sequentially illustrating the operation states of the centrifugal brake apparatus of a bait cast reel according to the present invention.

Figure 4:
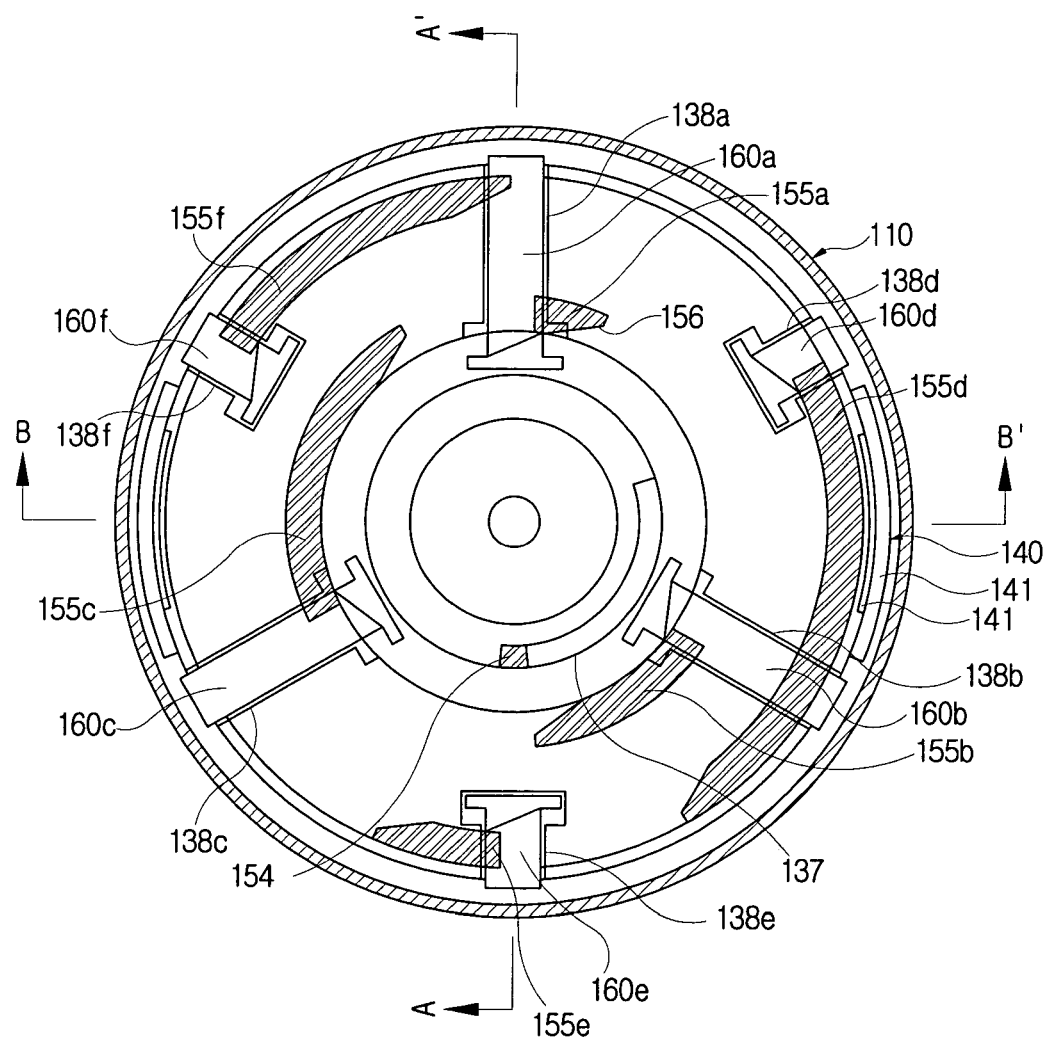
FIG. 4 is a plan view illustrating an installation state of a cover and brake shoe which are major elements of a centrifugal brake apparatus of a bait cast reel according to the present invention.
Figure 5:
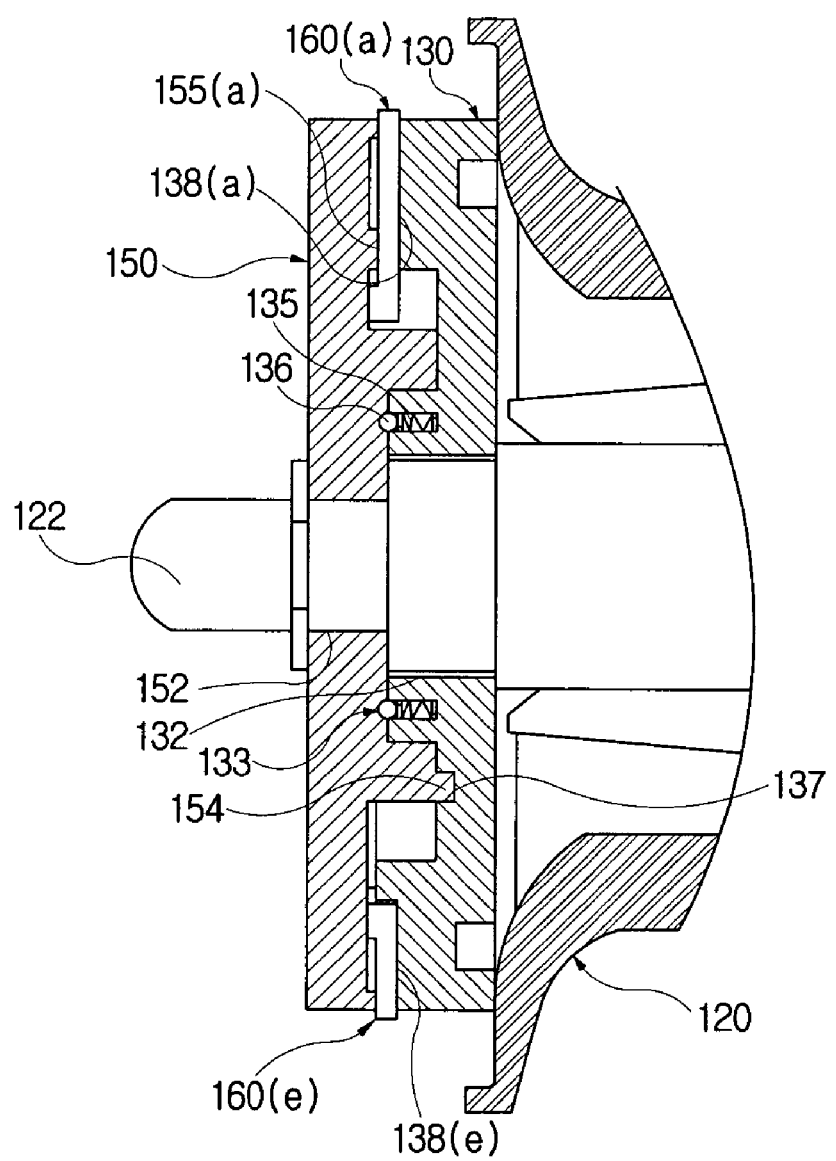
FIG. 5 is a cross sectional view taken along line A–A' of FIG. 4.
Figure 6:
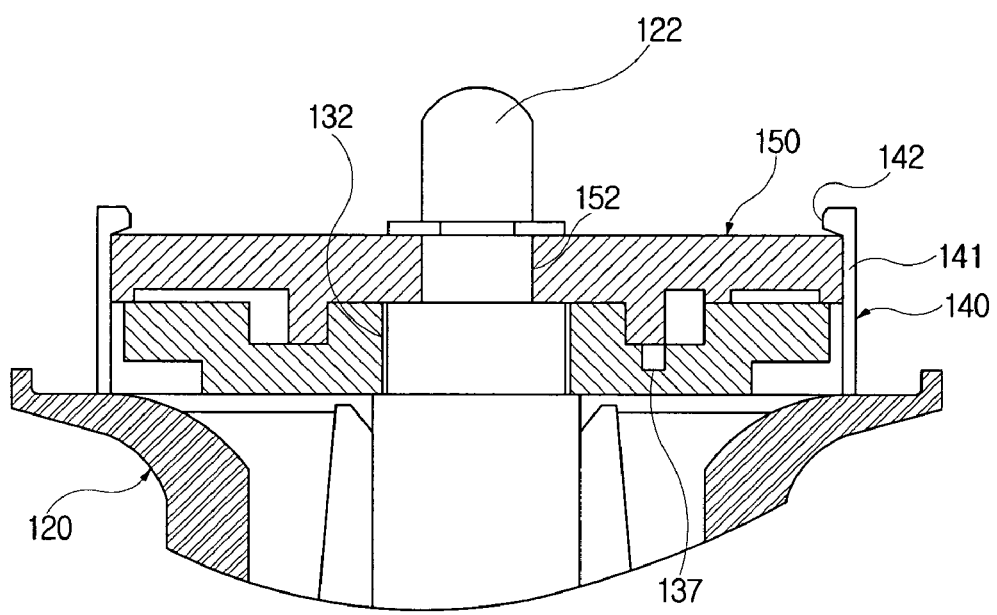
FIG. 6 is a cross sectional view taken along line B–B' of FIG. 4.

As shown in FIG. 4, in the initial state of the centrifugal brake apparatus of the bait cast reel according to the present invention, the brake shoes 160a, 160b, 160c, 160d, 160e and 160f slidably accommodated in the brake housing 130 are supported by the engaging protrusions 155a, 155b, 155c, 155d, 155e and 155f formed in the inner surface of the cover 150, so that the brake shoes 160a, 160b, 160c, 160d, 160e and 160f are prevented from being slid to the outside of the brake housing 130.

The first, second and third brake shoes 160a, 160b and 160c accommodated in the first, second and third slide grooves 138a, 138b and 138c are supported by the first, second and third engaging protrusions 155a, 155b and 155c, and the movements of the same are limited by a centrifugal force generated by the rotation of the spool 120. The fourth, fifth and sixth brake shoes 160d, 160e and 160f accommodated in the fourth, fifth and sixth slide grooves 138d, 138e and 138f are supported by the fourth, fifth and sixth engaging protrusions 155d, 155e, and 155f, and the movements of the same are limited by a centrifugal force which occurs as the spool 120 is rotated.

At this time, when rotating the cover 150 from the initial state at an angle of 35° in a certain direction, the fixed state of the first and fourth brake shoes 160a and 160d which are fixedly supported by the first and fourth engaging protrusions 155a and 155d provided in an inner surface of the cover 150 is released, and when the spool 120 is rotated, the first and fourth brake shoes 160a and 160d accommodated in the first and fourth slide grooves 160a and 160d are moved to the outside of the brake housing 130 by a centrifugal force. Therefore, a friction force occurs in the inner surface of the brake drum 110 provided in an outer side of the brake housing 130.

In addition, when rotating the cover 150 from the initial state at an angle of 70° in a certain direction, the fixed state of the first and fourth brake shoes 160a and 160d which are fixedly supported by the first and fourth engaging protrusions 155a and 155d provided in an inner surface of the cover 150 is released, and the at the same time, the fixed state of the second and fifth brake shoes 160b and 160e which are fixedly supported by the second and fifth protrusions 155b and 155e provided in an inner side of the cover 150, is released, and as the spool 120 is rotated, the second and fifth brake shoes 160b and 160e accommodated in the second and fifth slide grooves 138b and 138e are protruded to the outside of the brake housing 130 by a centrifugal force, so that a friction force occurs in an inner surface of the brake drum 110 provided in an outer side of the brake housing 130 like the first and fourth brake shoes 160a and 160d.

When rotating the cover 150 from the initial state at an angle of 105° in a certain direction, the fixed state of the first and fourth brake shoes 160a and 160d which are fixedly supported by the first and fourth engaging protrusions 155a and 155d provided in an inner surface of the cover 150 is released, and at the same time the fixed state of the second and fifth brake shoes 160b and 160e which are fixedly supported by the second and fifth engaging protrusions 155b and 155e is released, and at the same time the fixed state of the third and sixth brake shoes 160c and 160f which are fixedly supported by the third and sixth engaging protrusions 155c and 155f provided in an inner side surface of the cover 150 is released, so that the third and sixth brake shoes 160c and 160f accommodated in the third and sixth slide grooves 138c and 138f are protruded to the outside of the brake house 130 when the spool 120 is rotated. Therefore, a friction force occurs in an inner surface of the brake drum 110 provided in an outer side of the brake housing 130 like the first and fourth brake shoes 160a and 160d and the second and fifth brake shoes 160b and 160e.

As the cover is rotated, the number of brake shoes which apply a friction force in the brake drum in a state that each brake shoe is limitedly operated, is changed, so that it is possible to adjust the friction force which applies in the brake drum based on a user's setting, whereby it is possible to implement a proper rotation resistance force based on a user's casting force.

The centrifugal brake apparatus of a bait cast reel according to the present invention has the following advantages.

A plurality of the brake shoes are constructed to independently operate, and a cover is adapted to limit the operation of each brake shoe for thereby adjusting a rotation resistance force of a spool by a user when casting, and it is possible to implement a proper rotation resistance force with respect to a user's casting force.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A centrifugal force brake apparatus for a bait cast reel, comprising:
   a spool in which a spool shaft is rotatably engaged to a reel;
   a brake housing which is engaged to the spool shaft is rotated together with the spool and includes slide grooves formed in a radial shape in which brake shoes are respectively engaged for sliding movements; and
   a cover which is engaged to the brake housing is rotated together with the spool and is rotatably engaged with respect to the brake housing and includes a plurality of engaging protrusions for thereby selectively limiting the movements of the brake shoes, wherein as the cover is rotated with respect to the brake housing, the movements of the brake shoes are limited by the engaging protrusions, and a plurality of the brake shoes which are not limited by the engaging protrusions when the spool is rotated, are moved by a centrifugal force, so that a certain friction force is applied to a brake drum.

2. The apparatus of claim 1, wherein said brake shoe includes:
   a shoe having an end portion which contacts with the brake drum for thereby forming a certain friction force therein;
   an engaging surface which is formed in one surface of a lower portion of the shoe for thereby efficiently contacting with the engaging protrusion; and
   an engaging bar which is formed at both sides of the engaging surface for thereby preventing an escape from the slide groove.

3. The apparatus of claim 2, wherein said at least one brake shoe includes:
   a first brake shoe which is provided in one of an inner or outer side of the brake housing; and
   a second brake shoe which is provided in a reciprocal one of the outer or inner side of the brake housing and is shorter by a certain length compared to the first brake shoe.

4. The apparatus of claim 1, wherein an insertion groove is formed in a certain portion of the brake housing, a spring is inserted into the insertion groove, a click protrusion is supported by the spring, and a click groove corresponding to the click protrusion inserted in the insertion groove is formed in one side of the cover, so that when the cover is rotated with respect to the brake housing, the click protrusion inserted in the click groove is inserted or escaped for thereby generating a click sound.

5. The apparatus of claim 4, wherein said click groove is provided in multiple numbers uniformly at a regular angle with respect to the center of the cover for dividing the rotation angle of the cover with respect to the brake housing.

6. The apparatus of claim 1, wherein a limit circular groove having a certain angle with respect to the center is formed in the brake housing, and a limit protrusion inserted into the limit groove is formed in one side of the cover for thereby preventing the cover from being rotated by more than a certain angle with respect to the brake housing.

7. The apparatus of claim 1, wherein a pair of support panels having the same inner surfaces as the shapes of the outer surfaces of the cover are formed at both sides of the outer surface of the brake housing, and a support protrusion is formed in an end portion of the support panel for thereby preventing an escape of the cover.

8. The apparatus of claim 1, wherein said at least one slide groove corresponds to the shape of the at least one brake shoe in order for the brake shoe to be accommodated and includes an engaging shoulder portion formed in an end portion of the same for preventing an escape of the brake shoe, the at least one slide groove comprising a first slide groove in which a first brake shoe is accommodated and a second slide groove in which a second brake shoe is accommodated.

9. The apparatus of claim 1, wherein said engaging protrusion includes:
   a first engaging protrusion which is formed in an inner side of the cover and is adapted to limit the movement of a first of the at least one brake shoe; and
   a second engaging protrusion which is formed in an outer side of the cover opposite to the first engaging protrusion,
   wherein said first and second engaging protrusions are formed in a circular shape and have the same angle with respect to the center of the cover.

10. In a centrifugal force brake apparatus having brake shoes for applying friction forces to a brake drum for a bait cast reel, the improvements comprising:
   a spool having a spool shaft for rotatably engaging the reel;
   a brake housing which is engaged to the spool shaft, is rotated together with the spool and includes radial slide grooves for the brake shoes to slide in;
   a cover which is engaged to the brake housing, is rotated together with the spool and includes a plurality of engaging protrusions for selectively limiting the slide of the brake shoes for engagement with the brake drum by centrifugal force to apply a certain friction force to a brake drum; and
   means operative with the engaging protrusions for selecting the brake shoes having the limited slide, whereby to select the number of brake shoes engaging the brake drum.

* * * * *